E. C. THORSCHMIDT.
LIQUID MEASURING AND DISPENSING DEVICE.
APPLICATION FILED JAN. 14, 1913.
1,115,036.
Patented Oct. 27, 1914.
2 SHEETS—SHEET 1.
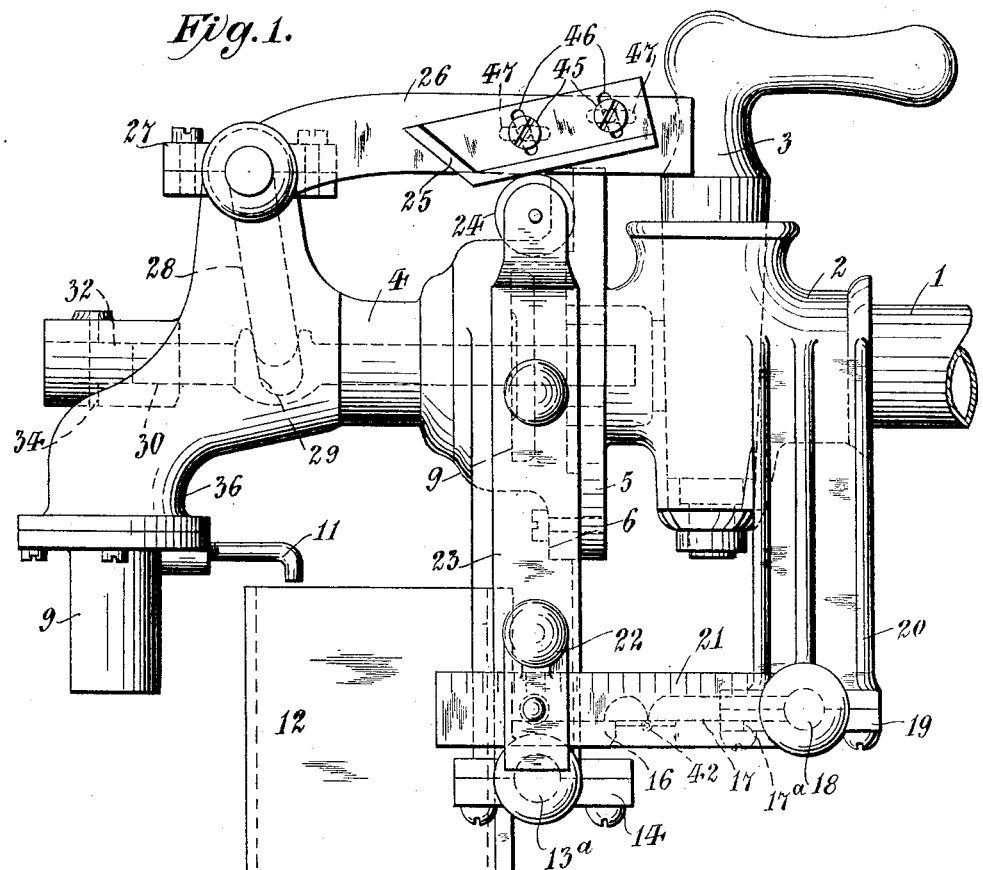
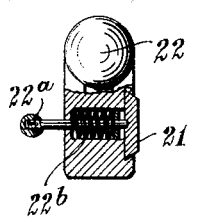
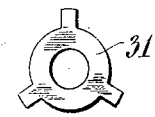
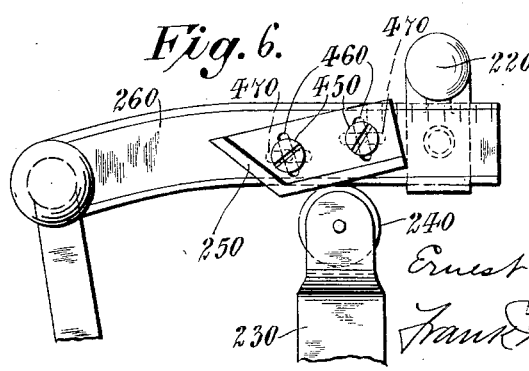
WITNESSES
INVENTOR
Ernest C. Thorschmidt
BY Frank W. Ashley
ATTORNEY E. C. THORSCHMIDT.
LIQUID MEASURING AND DISPENSING DEVICE.
APPLICATION FILED JAN. 14, 1913.
1,115,036.
Patented Oct. 27, 1914.
2 SHEETS—SHEET 2.
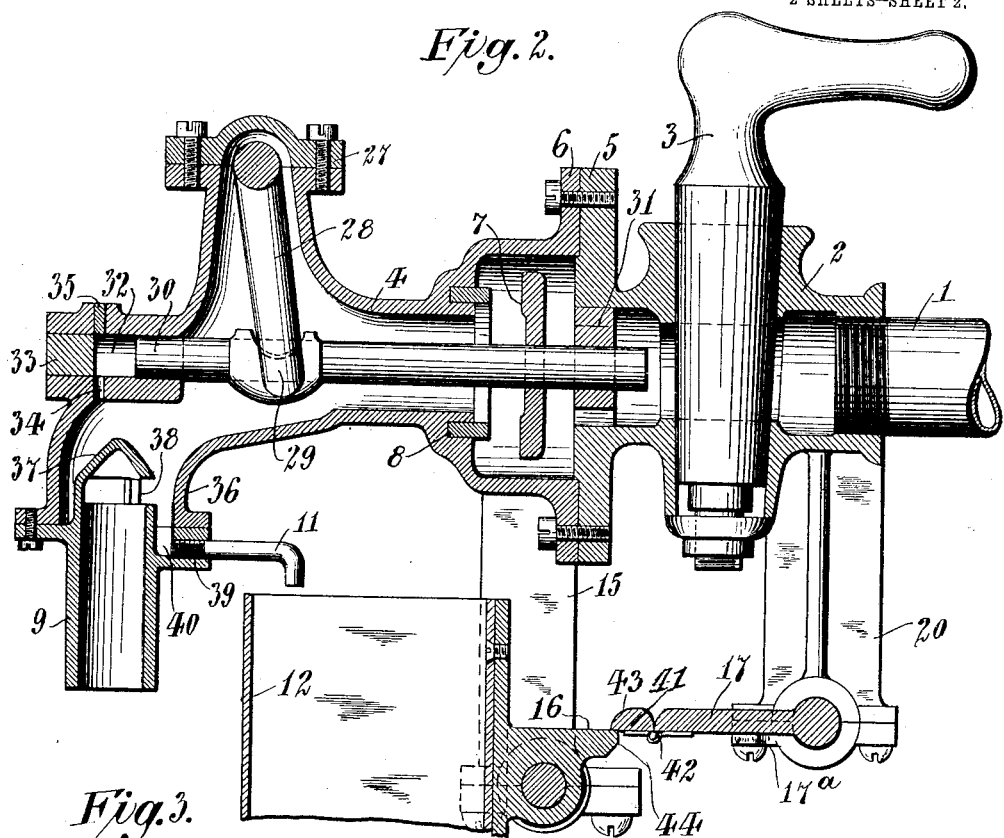
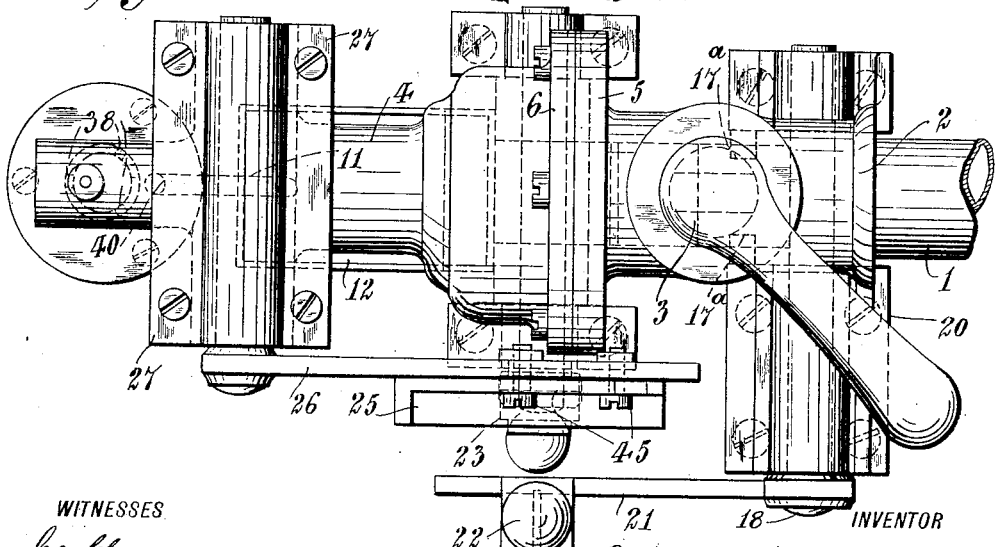

UNITED STATES PATENT OFFICE.

ERNEST C. THORSCHMIDT, OF NEW YORK, N. Y.

LIQUID MEASURING AND DISPENSING DEVICE.

1,115,036.  Specification of Letters Patent.  Patented Oct. 27, 1914.

Application filed January 14, 1913. Serial No. 741,966.

*To all whom it may concern:*

Be it known that I, ERNEST C. THORSCHMIDT, a citizen of the United States, and a resident of New York city, borough of Brooklyn, in the county of Kings and State of New York, have invented certain new and useful Improvements in Liquid Measuring and Dispensing Devices, of which the following is a specification.

This invention relates to devices for measuring liquids, more particularly to devices which automatically measure out and dispense a predetermined amount of liquid from some source of supply.

One object of the present invention is to provide simple means whereby any desired amount of liquid may be automatically measured out from a faucet and then the flow of liquid automatically stopped.

Another object is to provide means of this character which is sensitive so as to respond quickly to close the supply valve when the desired quantity has been dispensed.

A further object is to provide a simple and conveniently situated gaging device which accurately gages the amount of water passing through the faucet.

Further objects and advantages will appear from the detailed description and the novel features of construction and combination of parts will be particularly pointed out in the claims.

In the accompanying drawings illustrating the preferred embodiments of this invention, Figure 1 is an elevation of my improved measuring and dispensing device attached to a source of liquid supply. Fig. 2 is a vertical longitudinal section and Fig. 3 is a plan view of the device. Fig. 4 is a detail view illustrating the spider forming the guide for the stem of the automatic valve. Fig. 5 is a detail view partly in section illustrating the adjustable weight which slides upon the trip lever. Fig. 6 is a fragmental detail view illustrating a modified construction.

The principle upon which this invention is based is that relating to the flow of liquid through openings, such flow being proportional to the area of the opening. It is proposed, therefore, to shunt off a portion of the liquid through a small pipe emptying into a movable receptacle which is balanced by a weight so as to receive a certain amount of liquid therein, bearing a fixed proportion to the amount of liquid passing through the main opening. When the receptacle has received the required amount of liquid, it overbalances the weight and is emptied into the container, which receives the liquid dispensed. The receptacle in so emptying, also automatically shuts off a valve to stop the flow of liquid, and thus the desired amount is measured out. Subsequently, the receptacle may then be set and adjusted to measure out and dispense any other amount of liquid in a similar manner.

The liquid enters through the pipe 1 connected to the valve casing 2, having a cock 3 seated therein by which the liquid supply may be turned on or off manually. To this valve casing 2 is secured another casing 4 in a suitable manner as by the flanges 5 and 6 formed on the respective casings. In this casing 4 is mounted an automatic valve having a head 7 adapted to abut against the valve seat 8 to control the flow of the liquid through the casing 4, past the nozzle 9 into a container which receives the liquid to be dispensed. A part of the liquid passing through the casing 4 into the nozzle 9 is shunted off through a small pipe 11 and discharged into a receptacle 12 movably mounted at a suitable point adjacent to the nozzle. When the desired amount of liquid has been discharged into the container, the receptacle 12 is automatically released to empty its contents into the container and simultaneously close the automatic valve, above described.

I will now describe the means whereby the receptacle is adjusted and held so as to measure out the desired amount of liquid. The receptacle is attached to a lever 13 which extends from a shaft 13ª mounted in bearings 14 formed on hangers 15 extending downwardly from the casing 4. Projecting from this lever 13 at a point preferably slightly above the fulcrum thereof is a lug 16 which is engaged by an arm 17 projecting from a shaft 18 mounted in bearings 19 formed on hangers 20 extending down preferably from the casing 2. Attached to the outer extremity of the shaft 18 is an arm 21 having an adjustable weight 22 mounted thereon. This weight may be moved toward and from the shaft 18 constituting the fulcrum of the lever arm 17, and held in adjusted position by any desired means as by a pin 22$^a$ projected inwardly by a spring 22$^b$ seated in a bore within the weight. Thus, I vary the degree of leverage of the weight exerted upon the lever 13 to hold the receptacle 12 in an upright position.

A graduated scale may be formed upon the lever arm 21 to indicate the amount of liquid which will be dispensed corresponding to a given adjustment. This weight lever is held in horizontal position by a lug 17$^a$ extending from the hanger 20 under the arm 17, and forming a support for the arm and lever. When sufficient liquid has flown into the receptacle 12, the weight 22 will be overbalanced, so that the lug 16 will lift the arm 17 and ride past it and lever 13 will turn into a horizontal position so as to empty the contents of the receptacle 12 into the container. At the same time, the flow of liquid through the nozzle 9 will be arrested in the following manner: Extending upward from the shaft 13$^a$ is an arm 23 having at its upper end a roller 24 contacting a cam plate 25 attached to a lever arm 26 fulcrumed in bearings 27 within the casing 4. Extending from this fulcrum within the casing is another arm 28 having a fork 29 straddling the valve rod 30 which carries the valve head 7 hereinabove described. When the lever 13 and its arm 23 turn about their fulcrum releasing the lever arm 26, the latter falls by its own weight aided by the pressure of the liquid against the head 7. In so falling, the arm 28 of the lever 26 engaging the valve rod 30 closes the valve 7 and thus automatically stops the flow of liquid.

The valve rod 30 is preferably guided at both ends, the inner end thereof being guided in a spider 31 secured within the outer end of the casing 2 and the other end of the rod is guided in a socket 32. The latter may be formed by boring a hole into the outer end of the casing 4 and plugging the same with a plug 33. If desired, an aperture 34 may be formed in the wall of the socket communicating with the interior of the casing so as to allow the easy egress of any liquid which may escape past the bearing surfaces of the rod and socket into the interior of the socket. This aperture 34 may also be conveniently formed by boring into the casing and plugging up the outer opening by a plug 35.

To insure that the liquid flowing through the pipe 11 accurately gages the amount of liquid flowing through the nozzle 9, I extend the latter into the downwardly extending portion 36 which constitutes the mouth of the casing 4. An annular passage is thus formed between the upper portion of the nozzle and the mouth 36. At the top of this extension of the nozzle, I form a preferably conical cap 37 which is connected to the top of the nozzle by spaced webs 38, thus forming lateral segmental openings through which the liquid flows laterally from the annular passage into the nozzle. The pipe preferably extends laterally from the nozzle and is secured in a downwardly extending lug 39 having a bore communicating through the passage 40 with the annular passage above referred to. As the pipe 11 forms a lateral opening for the egress of the liquid, the conditions of flow are the same for the pipe as for the nozzle and thus the pipe will accurately gage the flow through the nozzle. The pipe and nozzle are removable together and thus, if desired, several nozzles and pipes of different sizes may be kept on hand and readily attached to the casing.

When the receptacle is reset, it is merely swung over until the lug 16 is again brought under the arm 17 of the weight lever 21. To facilitate the insertion of this lug, under the arm 17, the latter has a tip 41 hinged thereto by a spring hinge 42 which allows the same to be turned downwardly but prevents upward movement thereof. The upper outer edge of this tip 43 is beveled and thus is readily passed by the beveled lower edge 44 of the lug 16. As soon as the lug passes by, the tip is sprung back by its spring hinge and thus secures the lever 13 together with the receptacle in the proper position.

The cam 25 is preferably adjustable upon the arm 26 so as to secure the desired degree of opening of the valve 8. This adjustment may be obtained in any desired manner. Preferably I attach the cam by bolts 45 passing through transverse slots 46 in the cam plate and longitudinal slots 47 in the lever. In this way, any desired adjustment of the cam plate may be obtained.

In the modified construction illustrated in Fig. 6, the tripping device, consisting of the weight lever 21 and its arm 17, is dispensed with and instead the weight 22 is placed directly upon the arm 260 corresponding to the arm 26 in the preferred construction. The cam 250 is adjusted to the requisite degree by bolts 450 passing through slots 460 and 470 in the plate and lever corresponding to the preferred construction above described. The weight 220 may be adjusted to exert the necessary resistance to counter-balance the weight of the receptacle. When using this construction, the device may be calibrated and the positions of the weight upon the arm 260 corresponding to the amounts of liquid to be dispensed may be thus readily ascertained and fixed.

It will thus be seen that I have provided a comparatively simple and quite accurate device for automatically measuring out and dispensing predetermined amounts of liquid. The device is sensitive and responds quickly to shut off the supply when the desired amount has been dispensed. The gaging device consisting in the shunt pipe and nozzle are accurate inasmuch as substantially the same conditions of flow are provided for both the pipe and for the nozzle.

Having thus described my invention, I claim as new:

1. A liquid measuring and dispensing device comprising a casing, a valve within the casing, a nozzle at the mouth of the casing, a by-pass extending laterally from the nozzle, a movably mounted receptacle into which the liquid flowing from the by-pass may empty, means connected with the receptacle for holding the valve open, and means for holding the first mentioned means in position until a predetermined amount of liquid has passed into the receptacle.

2. A liquid measuring and dispensing device comprising a casing, a valve within the casing, a nozzle at the mouth of the casing, a by-pass extending laterally from the nozzle, a movably mounted receptacle into which the liquid flowing from the by-pass may empty, means connected with the receptacle for holding the valve open, and a weight lever engaging a projection extending from the receptacle to hold the latter in position until a predetermined amount of liquid has passed therein.

3. A liquid measuring and dispensing device comprising a casing, a valve within the casing, a nozzle at the mouth of the casing, a by-pass extending laterally from the nozzle; a pivoted member comprising a receptacle disposed adjacent to said nozzle and extending under the mouth of the by-pass, and an arm; a lever engaging the valve and held by said arm to maintain the valve open, and a movable weighted member engaging said pivoted member to maintain it upright until a predetermined amount of liquid has passed into the receptacle.

4. A liquid measuring and dispensing device comprising a casing, a valve within the casing, a nozzle at the mouth of the casing, a by-pass extending laterally from the nozzle; a pivoted member comprising a receptacle disposed adjacent to said nozzle and extending under the mouth of the by-pass, and an arm; a lever engaging the valve, a cam plate adjustably mounted upon the lever engaged by said arm to hold the valve open, and a weighted member engaging said pivoted member to maintain it upright until a predetermined amount of liquid has passed into the receptacle.

5. A liquid measuring and dispensing device comprising a casing having a nozzle extending therefrom, a by-pass formed adjacent to said nozzle, a valve for controlling the flow of liquid through said nozzle and by-pass; a pivoted member comprising a receptacle extending under the mouth of the by-pass, and an arm provided with a lug; a lever engaging the valve and held by said arm to maintain the valve open, a weighted member having a projection engaging said lug, said projection being provided with a hinged tip allowing the lug to freely pass the same in one direction but holding it from movement in the other direction.

6. A liquid measuring and dispensing device comprising a casing having a downwardly extending mouth, a nozzle secured thereto, said nozzle being provided with a cap and lateral segmental apertures, the upper end of said nozzle forming an annular passage within said mouth from which the liquid flows laterally into the nozzle, and a small outlet pipe secured to the nozzle and extending laterally from said annular passage.

7. A liquid measuring and dispensing device comprising a casing having a downwardly extending mouth, a nozzle secured thereto, said nozzle being provided with a conical cap and lateral segmental apertures, the upper end of said nozzle forming an annular passage within said mouth from which the liquid flows laterally into the nozzle, and a small outlet pipe secured to the nozzle and extending laterally from said annular passage.

8. In a liquid measuring and dispensing device comprising a casing, a valve within the casing controlling the flow of liquid therein, a nozzle having a by-pass therein connected to the mouth of the casing, means responsive to the flow of liquid from the by-pass for automatically controlling the valve, a valve stem for the valve, guiding means for said stem comprising a spider disposed in the casing for one end of the stem, and a socket for the other end, said socket having an aperture therein communicating with the casing to allow liquid to escape therefrom and to render said valve sensitive to the action of the automatic means.

9. A liquid measuring and dispensing device comprising a casing having a nozzle extending therefrom, a by-pass formed adjacent to said nozzle, a valve for controlling the flow of liquid through said nozzle and by-pass, a pivoted receptacle extending under the mouth of the by-pass, an arm extending from the receptacle having a lug extending therefrom above the fulcrum thereof, a lever engaging the valve and held by said arm to maintain the valve open, a weight lever having a projection engaging said lug, said projection being provided with a hinged tip allowing the lug to freely pass the same in one direction but holding it from movement in the other direction.

Signed at New York city, in the county of New York, and State of New York, this 13th day of January, A. D. 1913.

ERNEST C. THORSCHMIDT.

Witnesses:
FRANK M. ASHLEY,
GEORGE IVAN RUSSELL.